(12) United States Patent
Sledge et al.

(10) Patent No.: US 6,793,703 B1
(45) Date of Patent: Sep. 21, 2004

(54) AIR-FILTER APPARATUS

(75) Inventors: Susan S. Sledge, Granbury, TX (US); Mark A. Sledge, Granbury, TX (US)

(73) Assignee: IAQS, Inc., Oklahoma City, OK (US)

( * ) Notice: Subject to any disclaimer, the term of this patent is extended or adjusted under 35 U.S.C. 154(b) by 0 days.

(21) Appl. No.: 10/237,253

(22) Filed: Sep. 6, 2002

(51) Int. Cl.[7] .............................................. B01D 46/10

(52) U.S. Cl. ............................. 55/495; 55/501; 55/524; 55/DIG. 31; 55/DIG. 35

(58) Field of Search ......................... 55/495, 497, 499, 55/501, 482, 486, 487, DIG. 31, DIG. 35

(56) References Cited

U.S. PATENT DOCUMENTS

| | | |
|---|---|---|
| 2,054,809 A | 9/1936 | Fleisher |
| 2,139,675 A | 12/1938 | Fleisher |

Primary Examiner—Duane Smith
Assistant Examiner—Jason M. Greene
(74) Attorney, Agent, or Firm—McAfee & Taft

(57) ABSTRACT

A filter apparatus for use in filtering air flow through an air-conditioning or heating system. The filter apparatus comprises a frame, a filter element, and a support member for preventing deformation of the filter element due to the force of air flow thereacross. The frame has a substantially E-shaped cross-section formed by an outer side, a pair of legs, and a rib disposed between the legs such that first and second channel sections are formed. The support member is disposed in the first channel section and across a central opening through the frame such that the rib and one of the legs hold the support member in place without the necessity of attaching the support member to the frame. The filter element is disposed in the second channel section and across the central opening of the frame. The frame is formed of an extruded length of material having three notches cut therein. The material is bent adjacent to each of the notches to form three corners of the frame. Overlapping ends of the material form the fourth corner of the frame and are non-adhesively attached.

51 Claims, 3 Drawing Sheets

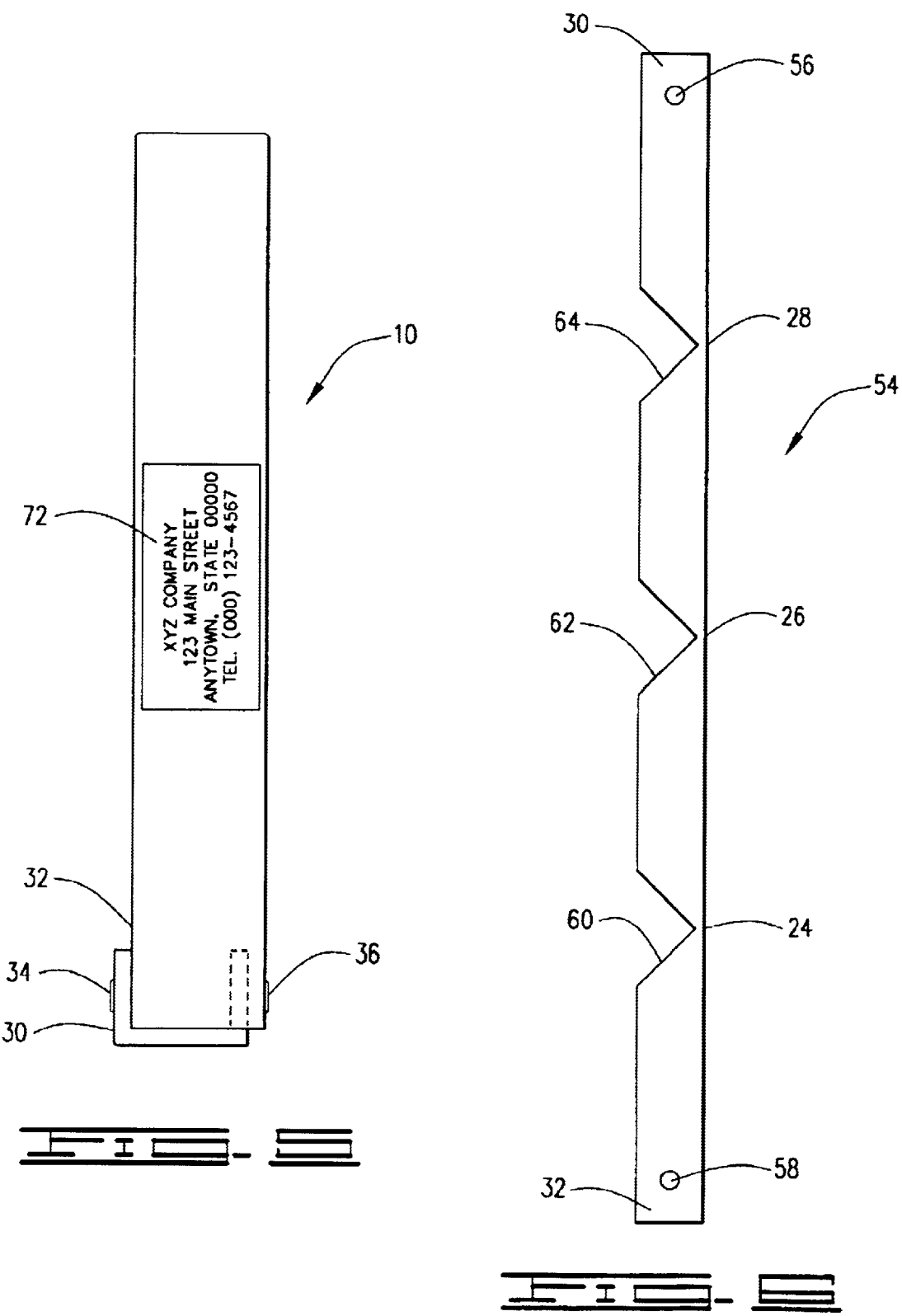

AIR-FILTER APPARATUS

FIELD OF THE INVENTION

This invention relates to filters, such as air filters for air-conditioning systems, and more particularly, to an air filter having a filtering element disposed in a frame with a support member on the downstream side of the filter element with the filtering element and support member being separated by a rib in the frame.

DESCRIPTION OF THE PRIOR ART

Filters, such as those used to filter air moving through ducts in air-conditioning and heating systems are well known. One common, inexpensive type of filter includes a filter element disposed in a cardboard frame. A support member for the filter element may be included. Such support members in these inexpensive filters may be made of light metal sheets with holes therethrough or similarly configured sheets of plastic. One disadvantage of these types of filters is that they are not durable and frequently will deform as a result of the force of the air flowing thereacross. This may result in gaps around the filters which allow air to pass thereby. This deformation makes such filters particularly hard to remove after use. Another disadvantage of these types of filters is that they are frequently made using adhesives. Such adhesives may emit fumes which get into the air supply and thus can contaminate air discharging from the airconditioning or heating system into the related building.

A solution to the deformation problem is to make more substantial air-filter apparatus which include a metallic frame and which use more substantial support members downstream from the filter elements. Air flow through these types of filters does not cause deformation. Therefore, gaps are not formed around the outer edges thereof, and they are easier to remove after use without knocking off dust and debris into the ductwork. However, some of these types of filters also use adhesives and have the resulting fume problem.

One known example of a filter having a metallic frame utilizes a square or rectangular frame formed of a metal member having a substantially C-shaped cross-section formed by an outer side and two, substantially parallel, inwardly extending legs which are substantially perpendicular to the outer side. Thus, an inwardly opening channel is formed in the frame, and the edges of a filter element are disposed in this channel so that the filter element covers a central opening through the frame. As the frame is being formed by bending a length of material into the square or rectangular shape, a support member for the filter element may be disposed in the frame. If the support member is left loose, it can sometimes cause difficulties in assembly of the entire apparatus, so the support member is usually fixedly attached to the frame, such as by welding or adhesives. A problem with welding is that it adds expense to the filter apparatus, and the problem with the use of adhesives has already been noted.

The present invention solves these problems by using an E-shaped cross-sectional shape for the material of the frame having an outer edge with a pair of inwardly extending legs perpendicular to the outer side and also includes a rib extending inwardly from the outer side and between the two legs. Preferably, the rib is parallel to the legs. When the frame is being formed, a support member may be disposed between the rib and one of the legs so that it is held in place without the necessity of welding or adhesives. The filter element is disposed between the rib and the other of the legs in a manner similar to that in the prior art. Thus, the present invention solves the problems of previous filters and the attachment of the metal support member and totally eliminates the need for adhesives.

SUMMARY OF THE INVENTION

The present invention is a filter apparatus, such as used in air-conditioning and heating systems for building. The filter could also be used in other applications where a filter is needed to remove foreign materials from flowing air or other gas.

Generally, the apparatus may be described as a frame apparatus for a filter. The apparatus comprises an outer frame with a central opening therethrough and defines an inwardly opening channel adapted for receiving a portion of the filter element therein, an inwardly extending rib disposed in the channel such that the filter element may be positioned to one side thereof, and a support member disposed in the frame and across the central opening on an opposite side of the rib from the filter element for providing support for the filter element. The frame has an outer side and a pair of inwardly extending legs forming the channel.

Preferably the legs are parallel, and the rib is parallel to at least one of the legs. The support member is held in the frame by the rib and one of the legs. Preferably, the rib is shorter than the legs. In the preferred embodiment, the rib and frame are integrally formed.

The support member comprises an expanded screen defining a plurality of generally diamond-shaped holes therein.

The frame preferably has generally parallelepiped configuration. In the illustrated embodiment, the frame is formed from a single piece of material having three bends, and the ends of the material are non-adhesively attached to one another, such as by riveting. In this embodiment, the material has a V-shaped notch formed therein adjacent to each of the bends such that a joint is formed by edges of the notches after the bends are made. The ends of the material overlap one another after the bends are made.

The frame is preferably made of a non-corrosive material, such as aluminum. The frame and support member preferably have smooth surfaces thereon to make the filter easier to install and remove and to protect the hands of users.

Stated in another way, the invention may be described as a filter apparatus comprising a frame defining a central opening therein, a filter element and a support for the filter element.

The frame has a substantially E-shaped cross-section with an outer side, a pair of legs extending inwardly from the outer side, and a rib disposed between the legs and extending inwardly from the outer side, thus forming first and second channel sections in the frame. The support is disposed across the central opening and has a portion disposed between the rib and one of the legs. The filter element is also disposed across the central opening and has a portion disposed between the rib and the other of the legs.

The filter element may be made of a tackified material. That is, it may have a tacky or sticky surface to increase its ability to trap foreign particles in the air flow, such as dust.

Numerous objects and advantages of the invention will become apparent from the following detailed description of the preferred embodiment and the drawings illustrating such embodiment.

BRIEF DESCRIPTION OF THE DRAWINGS

FIG. 5 is an end view of the air-filter apparatus.

FIG. 6 illustrates a length of material used to form a frame of the air-filter apparatus prior to a bending operation.

DETAILED DESCRIPTION OF THE PREFERRED EMBODIMENT

Figure 1:
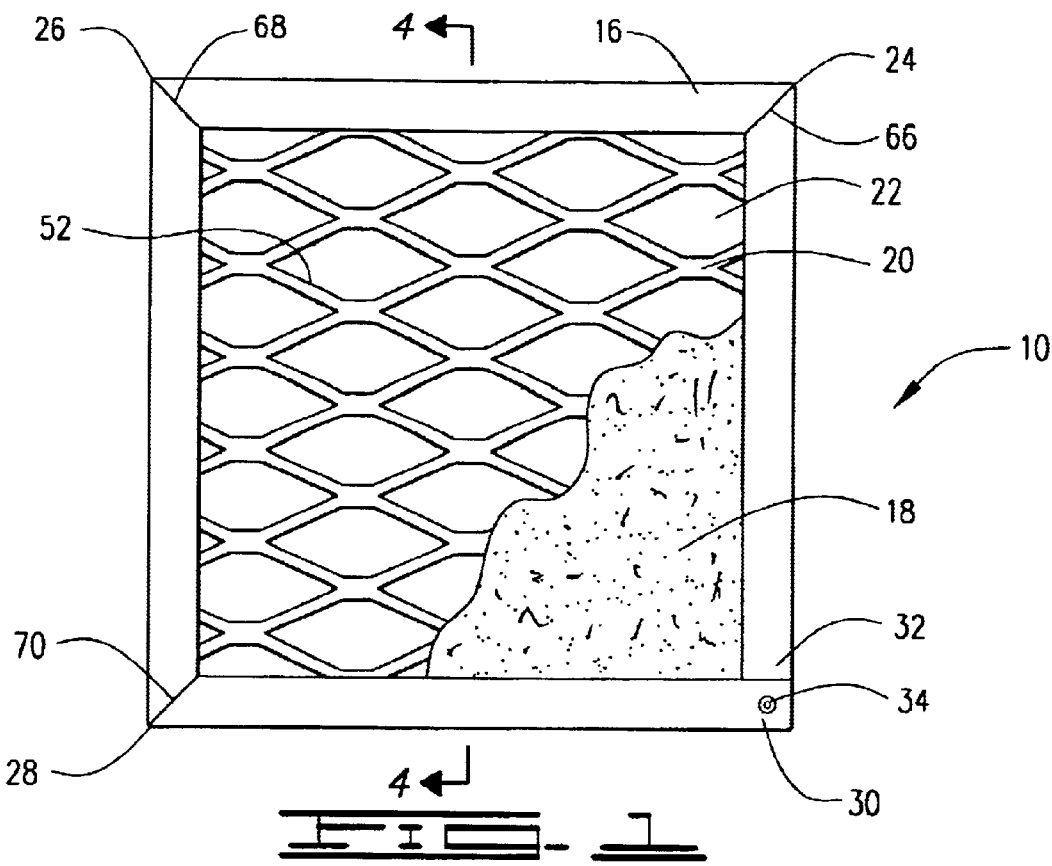
FIG. 1 shows an upstream side elevation view of the air-filter apparatus of the present invention.
Figure 2:
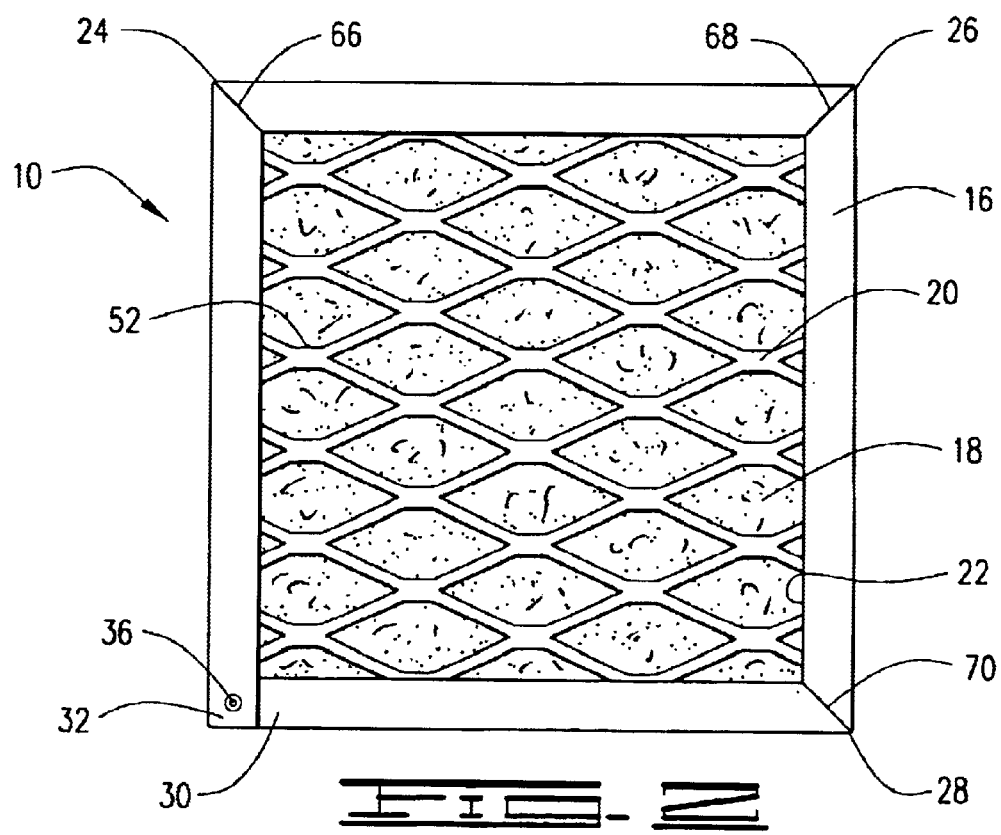
FIG. 2 shows a downstream side elevation of the apparatus.
Figure 3:
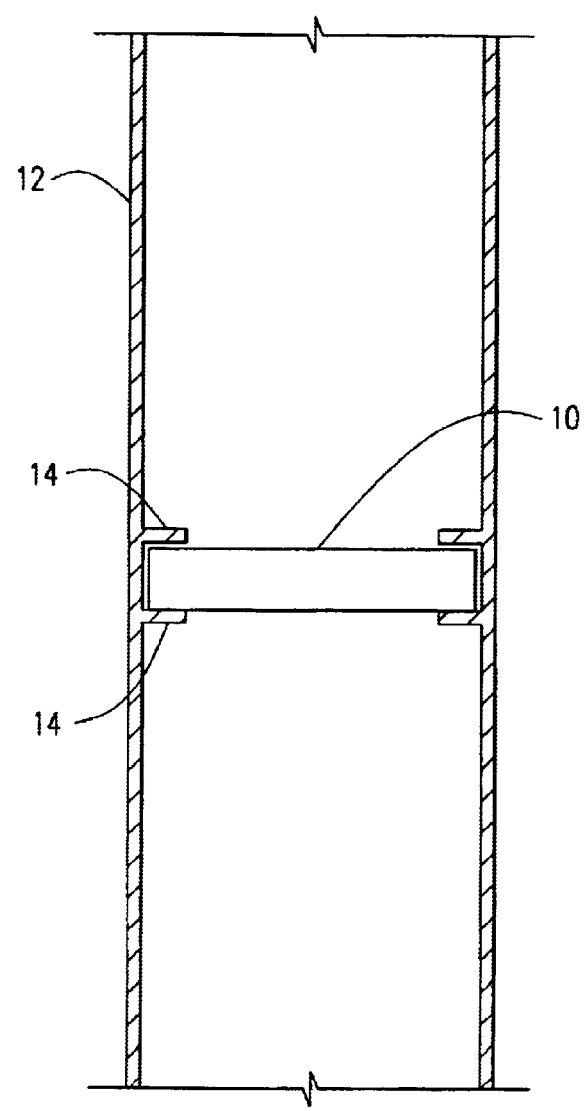
FIG. 3 illustrates the air-filter apparatus in position in a duct.

Referring now to the drawings, and more particularly to FIGS. 1 and 2, the air-filter apparatus of the present invention is shown and generally designated by the numeral 10. Filter 10 is designed for use in devices such as air-conditioning systems, and as seen in FIG. 3, filter 10 is shown positioned in an air duct 12 of a kind known in the art. Air duct 12 is associated with a related air-conditioning system (not shown), also of a kind known in the art. The location of air filter 10 in air duct 12 may be by any known means, such as sliding it between a pair of flanges 14. The invention is not intended to be limited to any particular type of air-duct configuration or air-conditioning system.

Referring again to FIGS. 1 and 2, air duct 10 comprises three main components: a frame 16, a filter element 18 and a support member 20. Only a portion of filter element 18 is shown FIG. 1 so that support member 20 is visible. However, it should be understood that filter element 18 extends completely across central opening 22 in frame 16.

As will be further discussed herein, frame 16 is preferably formed from a single length of material in a generally parallelepiped configuration. That is, the preferred shape of frame 16 is that of a square or rectangle, and a square configuration is illustrated in the drawings. However, the actual outer shape of frame 16 is not required to be rectangular or square. For example, a circular configuration would also take advantage of the new features of the present invention.

As seen in FIGS. 1 and 2, frame 16 has three corners formed by bends 24, 26 and 28 and a fourth corner formed by overlapping ends 30 and 32. A fastening means, such as a pair of rivets 34 and 36 are used to attach ends 30 and 32 to one another. On one side of frame 16, end 30 overlaps end 32, and on the opposite side, end 32 overlaps end 30. See FIGS. 1 and 2, respectively. This overlap may also be seen in FIG. 5.

Figure 4:
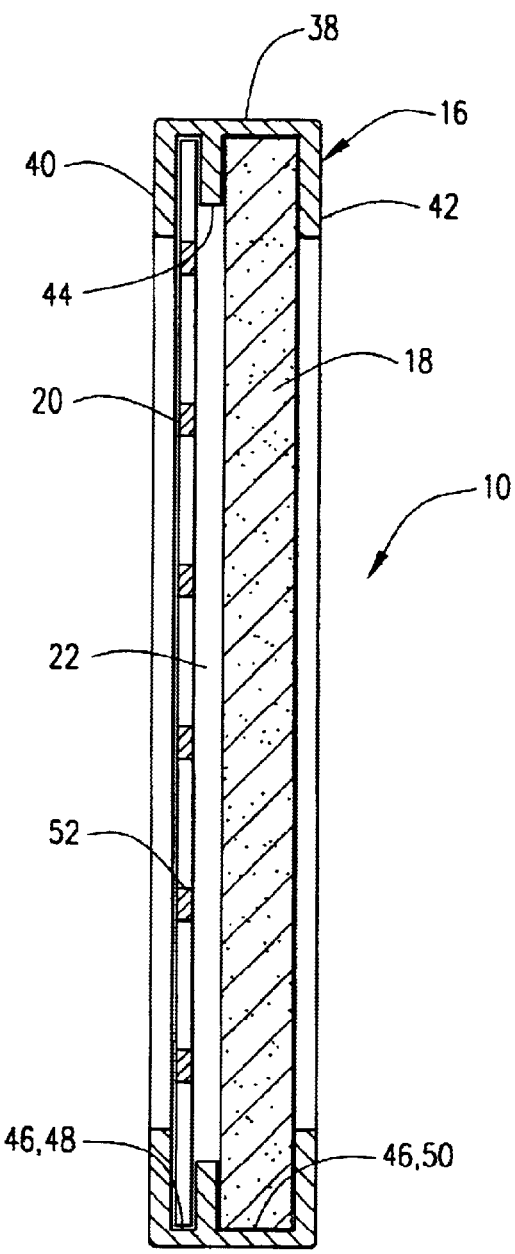
FIG. 4 is a cross-section taken along lines 4—4 in FIG. 1.

Referring now to FIG. 4, it will be seen that frame 16 is formed of material having a substantially E-shaped cross-section. This shape is defined by an outer side 38, a pair of inwardly extending legs 40 and 42, and an inwardly extending rib 44. Legs 40 and 42 are preferably parallel and extend substantially perpendicular to outer side 38 such that a generally annular channel 46 is defined and opens inwardly toward central opening 22. Rib 44 extends inwardly from outer side 38 between legs 40 and 42. In this way, channel 46 is split into a first channel section 48 formed between rib 44 and first leg 40 and a second channel section 50 between rib 44 and second leg 42. In the preferred embodiment, but not by way of limitation, rib 44 is parallel to legs 40 and 42 and is shorter than the legs.

Also in the preferred embodiment, rib 44 is closer to first leg 40 than second leg 42 so that first channel section 48 is narrower than second channel section 50. Support member 20 is disposed across central opening 22 such that edges thereof extend into first channel section 48 between rib 44 and first leg 40. It will be seen by those skilled in the art that support member 20 is thus located within frame 16 and is prevented from any significant movement therein.

Support member 20 as shown in the illustrated embodiment is made of a piece of expanded metal defining a plurality of generally diamond-shaped openings or holes 52 therethrough. The number and shape of openings 52 is not critical, however, and the invention is not intended to be limited to a support member formed of expanded metal. For example, support member 20 could be a sheet of material having a plurality of circular holes therein or any other shape of holes or pattern or spacing thereof. All that is necessary is that there be a sufficient total area of the openings that air flowing therethrough is not impeded significantly.

Preferably, frame 16 and support member 20 are formed with smooth surfaces thereon. This makes it easier to install and remove apparatus 10. That is, it provides a "clean" removal without hanging up on any portion of duct 12 and thus minimizing the possibility of knocking dust or debris off of apparatus 10 and into the duct. The smooth surfaces also provide protection for the hands of users.

Filter element 18 is of a kind generally known in the art, such as those made of spun fiberglass, foam, paper, etc. Filter element 18 may be made of a tackified media. That is, it may have a tacky or sticky surface to better entrap foreign particles, such as dust, in the air stream. Filter element 18 is also disposed across central opening 22 in frame 16. Edges of filter element 18 extend into second channel section 50 between rib 44 and second leg 42. As seen in FIG. 4, filter 10 is designed for air flow from right to left. It will thus be seen that support element 20 prevents any significant deformation of filter element 18 as a result of such air flow therethrough.

The use of material having an E-shaped cross-section with a rib 44 will be seen to provide a convenient and simple way to locate and fix support member 20 within frame 16 while still providing a means for locating filter element 18. Support member 20 is held in place without the necessity of fixedly attaching it to frame 16, such as the welding or use of adhesive described in the prior art.

Referring now to FIG. 6, a length of material 54 used to form frame 16 is shown. The material is preferably a length of extruded non-corrosive metal, such as aluminum or any other suitable material, which has the E-shaped cross-section previously described. Holes 56 and 58 are formed in ends 30 and 32, respectively, and it will be seen that these holes are adapted for receiving rivets 34 and 36 when material 54 is bent into the parallelepiped configuration of frame 16 around support member 20. A plurality of notches 60, 62 and 64 are cut into material 54 adjacent to the desired location of bends 24, 26 and 28, respectively. In the illustrated embodiment, notches 60, 62 and 64 have a V shape and are 90° angles. Thus, when material 54 is bent to form frame 16, notches 60, 62 and 64 are closed so that edges of the notches form joints 66, 68 and 70, respectively, as shown in FIGS. 1 and 2.

When 90° bends 24, 26 and 28 are made in material 54, the parallelepiped shape of frame 16 is thus defined. Because frame 16 is thus formed of a single piece of material, the only attaching means that is required is at the previously described overlap of ends 30 and 32, such as rivets 34 and 36 previously described.

A label 72 may be affixed to frame 16 as shown in FIG. 6 to provide indicia about the direction of air flow and/or about how to obtain replacement filter elements 18.

It will be seen, therefore, that the air-filter apparatus of the present invention is well adapted to carry out the ends and advantages mentioned, as well as those inherent therein. Numerous changes in the arrangement and construction of parts may be made by those skilled in the art. All such changes are encompassed within the scope and spirit of the appended claims.

What is claimed is:

1. A frame apparatus for a filter element, said apparatus comprising:
    an outer frame with a central opening therethrough and defining an inwardly opening channel adapted for receiving a portion of the filter element therein, the filter element comprising a filter element for filtering air or other gases moving therethrough and through ducts in air conditioning and heating systems;
    an inwardly extending rib disposed in said channel such that the filter element may be positioned adjacent one side thereof; and
    a support member disposed in said frame and across said central opening adjacent an opposite side of said rib from the filter element for providing support for the filter element.

2. The apparatus of claim 1 wherein said frame has an outer side and a pair of inwardly extending legs forming said channel.

3. The apparatus of claim 2 wherein said legs are parallel.

4. The apparatus of claim 2 wherein said rib is parallel to at least one of said legs.

5. The apparatus of claim 2 wherein said support member is held in said frame by said rib and one of said legs.

6. The apparatus of claim 2 wherein said rib is shorter than said legs.

7. The apparatus of claim 1 wherein said rib and frame are integrally formed.

8. The apparatus of claim 1 wherein said support member comprises an expanded screen.

9. The apparatus of claim 1 wherein said frame has a generally parallelepiped configuration.

10. The apparatus of claim 9 wherein:
    said frame is formed from a single piece of material having three bends; and
    ends of said material are attached to one another.

11. The apparatus of claim 1 wherein said frame is made of a non-corrosive material.

12. The apparatus of claim 11 wherein said material is aluminum.

13. The apparatus of claim 1 wherein said frame and support member have smooth surfaces thereon.

14. A filter apparatus comprising:
    a frame defining a central opening therethrough and having a generally E-shaped cross-section with an outer side, a pair of legs extending inwardly from said outer side, and a rib disposed between said legs and extending inwardly from said outer side;
    a support disposed across said central opening and having a portion disposed between said rib and one of said legs; and
    a filter element disposed across said central opening and having a portion disposed between said rib and the other of said legs.

15. The apparatus of claim 14 wherein said legs are parallel.

16. The apparatus of claim 15 wherein said rib is parallel to said legs.

17. The apparatus of claim 14 wherein said rib is shorter than said legs.

18. The apparatus of claim 14 wherein said frame is formed from a single piece of material.

19. The apparatus of claim 18 wherein said material is an extruded length of non-corrosive material.

20. The apparatus of claim 19 wherein said material is aluminum.

21. The apparatus of claim 18 wherein:
    said material has three substantially right-angle bends; and
    ends of said material are adjacent to one another.

22. The apparatus of claim 21 wherein said ends are attached to one another.

23. The apparatus of claim 22 wherein said ends are attached by a rivet.

24. The apparatus of claim 21 wherein said material has a plurality of V-shaped notches formed therein prior to bending, said notches generally locating the bends.

25. The apparatus of claim 24 wherein said V-shaped notches close to form joints after bending.

26. The apparatus of claim 24 wherein said ends of said material overlap one another.

27. The apparatus of claim 14 wherein said support defines a plurality of holes therein.

28. The apparatus of claim 27 wherein said support comprises an expanded metal screen.

29. The apparatus of claim 28 wherein said holes are generally diamond shaped.

30. The apparatus of claim 14 wherein said frame and support have smooth surfaces thereon.

31. The apparatus of claim 14 wherein said filter element comprises tackified media.

32. A filter apparatus comprising:
    a frame defining a central opening therethrough and having a generally E-shaped cross-section such that inwardly opening first and second channel sections are formed;
    a support disposed across said central opening and having edges extending into said first channel section; and
    a filter element disposed across said central opening and having edges disposed in said second channel section.

33. The apparatus of claim 32 wherein said frame is formed of a single piece of material.

34. The apparatus of claim 33 wherein said material is an extruded length of non-corrosive material.

35. The apparatus of claim 34 wherein said material is aluminum.

36. The apparatus of claim 33 wherein:
    said material has three substantially right-angle bends; and
    ends of said material are adjacent to one another.

37. The apparatus of claim 36 wherein said ends are attached to one another.

38. The apparatus of claim 37 wherein said ends are riveted together.

39. The apparatus of claim 36 wherein said material has a plurality of V-shaped notches formed therein prior to bending to substantially locate the bends.

40. The apparatus of claim 39 wherein said V-shaped notches close to form joints after bending.

41. The apparatus of claim 36 wherein said ends of said material overlap one another.

42. The apparatus of claim 32 wherein said support defines a plurality of holes therein.

43. The apparatus of claim 42 wherein said support comprises an expanded metal screen.

44. The apparatus of claim 42 wherein said holes are generally diamond shaped.

45. The apparatus of claim 32 wherein said frame and support have smooth surfaces thereon.

46. The apparatus of claim 32 wherein said filter element comprises tackified media.

47. A frame apparatus for a filter element, said apparatus comprising:
   an outer frame with a central opening therethrough and defining an inwardly opening channel adapted for receiving a portion of the filter element therein;
   an inwardly extending rib disposed in said channel such that the filter element may be positioned to one side thereof; and
   a support member disposed in said frame and across said central opening on an opposite side of said rib from the filter element for providing support for the filter element;
   wherein the frame has a generally parallelepiped configuration; and
   wherein the frame is formed from a single piece of material having three bends and the ends of the material are attached to one another.

48. The apparatus of claim 47 wherein said ends are non-adhesively attached.

49. The apparatus of claim 48 wherein said ends are riveted together.

50. The apparatus of claim 47 wherein said material has a V-shaped notch formed therein adjacent to each of said bends such that a joint is formed by edges of said notches after said bends are made.

51. The apparatus of claim 47 wherein said ends of said material overlap one another after said bends are made.

* * * * *

UNITED STATES PATENT AND TRADEMARK OFFICE
CERTIFICATE OF CORRECTION

PATENT NO. : 6,793,703 B1
APPLICATION NO. : 10/237253
DATED : September 21, 2004
INVENTOR(S) : Susan S. Sledge and Mark A. Sledge It is certified that error appears in the above-identified patent and that said Letters Patent is hereby corrected as shown below:

On the title page of the patent, after "U.S. PATENT DOCUMENTS," insert the following references:

| | | |
|---|---|---|
| 2,459,802 | 01/1949 | Fleisher |
| 2,709,489 | 05/1955 | Keebler |
| 3,620,375 | 11/1971 | Atkins |
| 3,970,440 | 07/1976 | Copenhefer et al. |
| 4,105,423 | 08/1978 | Latakas et al. |
| 4,210,067 | 07/1980 | Evans, Jr. |
| 4,518,402 | 05/1985 | Dargel |
| 4,549,887 | 10/1985 | Joannou |
| 4,570,844 | 02/1986 | Wysocki |
| 4,600,419 | 07/1986 | Mattison |
| 4,737,174 | 04/1988 | Pontius |
| 4,978,375 | 12/1990 | Il Yoo |
| 5,037,455 | 08/1991 | Scheineson et al. |
| 5,071,555 | 12/1991 | Enbom |
| 5,183,488 | 02/1993 | Deering |
| 5,232,478 | 08/1993 | Farris |
| 5,342,423 | 08/1994 | Taft |
| 5,344,677 | 09/1994 | Hong |
| 5,437,701 | 08/1995 | Townsley |
| 5,492,587 | 02/1996 | Hong |
| 5,525,136 | 06/1996 | Rosen |
| 5,578,113 | 11/1996 | Glenn |
| 5,704,953 | 01/1998 | Stemmer |
| 5,795,361 | 08/1998 | Lanier, Jr. et al. |
| 5,827,340 | 10/1998 | Fiske |
| 5,858,045 | 01/1999 | Stemmer et al. |
| 5,922,096 | 07/1999 | Stemmer |
| 5,952,622 | 09/1999 | LePoutre |
| 5,962,820 | 10/1999 | LePoutre |
| 6,007,596 | 12/1999 | Rosen |
| 6,126,708 | 10/2000 | Mack et al. |
| 6,319,300 | 11/2001 | Chen |
| 6,319,307 | 11/2001 | Shanks et al. |

UNITED STATES PATENT AND TRADEMARK OFFICE
CERTIFICATE OF CORRECTION

PATENT NO. : 6,793,703 B1
APPLICATION NO. : 10/237253
DATED : September 21, 2004
INVENTOR(S) : Susan S. Sledge and Mark A. Sledge It is certified that error appears in the above-identified patent and that said Letters Patent is hereby corrected as shown below:

On the title page of the patent, after "U.S. PATENT DOCUMENTS," insert the following references: (continued)

| | | |
|---|---|---|
| 6,363,934 | 04/2002 | Metzger |
| 6,379,438 | 04/2002 | Schneider et al. |

On the title page of the patent, please add "FOREIGN PATENT DOCUMENTS" and insert the following references:

| | | |
|---|---|---|
| EP | 0 355 354 A1 | 02/1990 |
| EP | 0 355 354 B1 | 02/1990 |
| WO | 93/12858 | 07/1993 |
| EP | 0 670 173 A1 | 09/1995 |
| EP | 0 837 238 A2 | 04/1998 |
| EP | 0 620 755 B1 | 10/1994 |
| WO | 99/00173 | 01/1999 |
| WO | 00/18489 | 04/2000 |
| WO | 01/47620 A1 | 07/2001 |
| WO | 02/04091 A1 | 01/2002 |

Column 1, line 29
Delete "airconditioning" and substitute -- air-conditioning -- therefor.

Column 6, line 19
Delete "claim 24" and substitute -- claim 21 -- therefor.

Signed and Sealed this

Twenty-fifth Day of December, 2007

JON W. DUDAS
*Director of the United States Patent and Trademark Office*